United States Patent [19]
Cucinotta et al.

[11] Patent Number: 5,663,546
[45] Date of Patent: Sep. 2, 1997

[54] METHOD FOR HOLDING AND DISPENSING CASH UPON DEMAND AT A REMOTE LOCATION

[75] Inventors: Robert P. Cucinotta, Los Gatos; Karim Maskatiya, Atherton, both of Calif.

[73] Assignee: USA Processing Inc., Sunnyvale, Calif.

[21] Appl. No.: 516,714

[22] Filed: Aug. 18, 1995

[51] Int. Cl.$^6$ .................................................. G06F 17/60
[52] U.S. Cl. .................................................. 235/379
[58] Field of Search .................................. 235/379, 380, 235/381

[56] References Cited

U.S. PATENT DOCUMENTS

| | | | |
|---|---|---|---|
| 5,302,811 | 4/1994 | Fukatsu | 235/381 |
| 5,350,906 | 9/1994 | Brody et al. | 235/381 X |
| 5,477,038 | 12/1995 | Levine et al. | 235/380 |

*Primary Examiner*—Donald T. Hajec
*Assistant Examiner*—Jeffrey R. Filipek
*Attorney, Agent, or Firm*—Townsend and Townsend and Crew

[57] ABSTRACT

Cash is given to a person confidentially and anonymously by first receiving an amount of cash from a person and, without identifying the person from whom the cash was received, or to whom it is to be paid out, the amount of cash is identified by a code such as the PAN code. The holder of the cash is part of a network including multiple card readers at remote transaction points, and the identifying code is encoded on a card. When the holder of the card desires a sum of cash not exceeding the amount of cash held by the cash holder, the card is inserted in the card reader at the transaction point, the authenticity of the card is verified, as with a PIN number, and the holder then sends a signal to the card reader at the transaction point authorizing the payout of the requested sum of cash. By identifying the amount of cash held by the holder with a code number; for example, on the basis of cash received from a person, and securing access to the cash by requiring a linking of the code number with an identification number, the amount of cash to be held can be received from and the requested sum of cash can be paid to the person in question without requiring any form of identification or pre-establishing an account, to thereby maintain confidentiality and anonymity not otherwise available when dealing with anything but cash.

7 Claims, 3 Drawing Sheets

METHOD FOR HOLDING AND DISPENSING CASH UPON DEMAND AT A REMOTE LOCATION

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office file or record, but otherwise reserves all copyright rights whatsoever.

BACKGROUND OF THE INVENTION

This invention relates to the safekeeping and distribution of cash upon demand at geographically remote locations.

Although checks, credit cards and automatic teller machine ("ATM") cards have replaced cash for many transactions, under many circumstances and for a variety of reasons cash is still in demand and frequently required to pay for goods and services. The problem with cash, aside from being bulky and inconvenient when carried in large amounts, is that it is person-independent; i.e. cash cannot be identified as belonging to any particular person. Instead, whoever carries it can use it. Thus, when cash is lost or stolen, for example, the person acquiring it can use it without danger of being detected. Hence, there has been a shift to increasingly rely on other modes of payment to eliminate the problems associated when dealing with cash.

One of the most widely used alternatives to cash is checks. They are simple to write and to process. However, they expose the person accepting the check to the danger of possible nonpayment; for example, due to insufficient funds in the account against which it is drawn. Checks are also an inconvenience to the person writing them because a bank account must first be established and opened, which is a time-consuming and relatively complicated procedure. Moreover, to provide the person accepting the check with some assurance that payment will be received and that the check is not a forgery, the person writing the check is typically subjected to a relatively elaborate identification procedure. The complications attending payment of a check increase with the geographic separation between the bank or other financial institution against which the check is drawn and the place where the check is tendered so that, for example, checks are relatively infrequently used in states outside the state where the account is located, and they are rarely used abroad.

To provide the person accepting payment in the form of a check with more security that payment will actually be received, so-called travelers checks are being used. These are checks issued by a responsible financial institution, which guarantees payment, and they are typically purchased from a variety of vendors. Travelers checks identify the person who purchased and/or is entitled to negotiate them, and when presented they typically require that the person be fully identified prior to acceptance to eliminate possible fraud as when an unauthorized person who gained access to a check attempts to forge the required countersignature. Although travelers checks are an improvement over conventional checks from a security point of view, purchasing, carrying, dealing with and negotiating them is still relatively cumbersome and time consuming. Moreover, a person accepting a travelers check has to await actual payment until it has cleared the normal check processing channels, which can be quite slow when a check is tendered at remote locations.

A further alternative to paying cash are today's widely used credit cards. They are now accepted at literally millions of places, most of which are part of a communications network that links them with the card issuing financial institutions. Although credit cards pose the risk of fraudulent use by unauthorized persons; for example, when they are stolen, they greatly speed up the transaction and actual payment to the vendor. A drawback of payment by credit card is that in order to use them one must first establish an account at an authorized financial institution such as a bank, a savings and loan association, and the like. This is a time-consuming process which requires background investigations on the part of the financial institution, credit checks and the life. As a result, there is a fairly large segment of the population which, for one reason or another, cannot or does not obtain credit cards. In addition, a credit card is subject to limits and relatively steep fees charged to the merchant who accepts it as well as the person to whom it is issued.

A still further alternative to dealing with cash is an ATM card, which is tied to a specific account at a financial institution and which authorizes a user to withdraw cash from ATMs. The amount of cash that can be withdrawn over a given time interval, such as a day, is limited, typically to no more than a few hundred dollars. Like credit cards, ATM cards require that an account be established at a financial institution; without an account, ATM cards are not available as an alternative to carrying cash.

Thus, cash is still often the preferred, and sometimes the only means for settling a transaction. Cash provides the user thereof with a degree of privacy and anonymity and speeds up the completion of a transaction that is not attainable with any of the presently available payment alternatives. Hence, for one reason or another, persons prefer or are required to sometimes carry with them relatively large amounts of cash. It can not only be lost or stolen, it can subject the carrier to danger from unscrupulous criminals. Consequently, there still is a need for an alternative to carrying cash which is as convenient and private as cash.

Attempts to solve this dilemma have been made. For example, certain institutions, such as telephone companies, issue debit cards. They have a given "value" and can be used to pay for goods or services, such as for long distance calls, for example. Debit cards are issued against payment by cash but can only be used to pay for goods or services offered by the issuing company. Thus, their use is severely limited and they lack the versatile aspects of cash entirely; they are effectively no more than a prepaid payment plan of the provider of given goods or services.

SUMMARY OF THE INVENTION

The present invention couples the ease of use, anonymity and certainty of payment associated with cash transactions with the security afforded by machine-readable, coded cards, such as credit cards, while eliminating the cumbersomeness and costs of the latter. This is achieved by holding an amount of cash at a central location and identifying the cash and the corresponding card with an anonymous security code, meaning a code which does not identify a person, but only the amount of cash in question. Upon presentation of the card at a transaction point, the code is read and relayed to the holder of the cash together with the sum of cash that is requested for verification. Upon the receipt of an authorization signal, the cash is then paid to the person.

In this series of transactions, the person or persons who hand the amount of cash to the holder and/or subsequently request cash never needs to be identified. Further, the present invention takes advantage of the far-flung network of already existing card reading machines, such as credit card reading terminals and ATMs, to effect the payout of the cash regardless of how remote the machine may be from the location where the cash is being held. Further, the present invention advantageously utilizes already existing and widely used networks such as, for example, the networks known under the service marks INTERLINK, PLUS SYSTEM, or STAR SYSTEM, to name a few. They link many if not most credit card reading terminals and ATMs with the respective financial institutions so that the benefits of the present invention can be enjoyed virtually worldwide.

Thus, to have cash available on demand in accordance with the present invention without having to carry it around and without the need for establishing an account at a financial institution and/or identifying oneself in any manner, a given amount of cash is given to a holder for safekeeping. The amount of cash is identified with a code, without thereby identifying the person from whom the cash was received, and a card is issued to the person who carries the same code in machine-readable form. The holder preferably also provides the person with a PIN number as a security device without which the card cannot be used.

When the person is in need of cash, the card is inserted in the next available card reading machine, such as an ATM or a credit card reading terminal, for example, which machine-reads the code carried on the card and sends it, together with the PIN number and the requested sum of cash, via a communication link, preferably an established network linking ATMs and credit card reading machines with financial institutions, to the holder of the cash. The held amount of cash is compared to the requested sum of cash and if the former exceeds the latter an authorization signal is forwarded to the machine. Upon receipt of the authorization signal, the machine, or the operator of the machine, pays to the person the requested sum of cash. Should the requested sum of cash exceed the amount of cash held by the holder, a refusal signal is sent to the machine from which the request was received, signalling that the requested sum of cash should not be paid to the person presenting the card.

As the foregoing demonstrates, one can participate in the system of the present invention by little more than handing the holder of the cash an amount of cash, without ever identifying himself or herself (meaning without requiring personal identification and without establishing an account such as a bank or credit card account), and receiving an encoded card and a PIN number in return, a transaction which takes no more than a few minutes and requires no identification. A lost card cannot be misused because the finder neither knows the PIN number nor, typically, that any cash can be obtained with the card, much less how much cash can be obtained.

At the receiving end at a location remote from where the amount of cash is held, cash is similarly quickly available. All that is required is to insert the card in or slide it through a card reader, supply the PIN number; for example, by punching it into a keypad on the reader together with the sum of cash that is requested, and, provided the PIN number is correct and the requested sum of cash does not exceed the amount of cash held by the holder, the cash is received. The transaction is virtually instantaneous and also requires no personal identification.

Aside from speed, confidentiality and anonymity, the present invention also greatly enhances safety. For example, checks are frequently cashed at easily accessible and observable locations such as check cashing establishments where transactions can be observed by unscrupulous criminals who, following the cashing of a check, may attempt to rob the person who just received the cash. Additionally, since cash checking establishments must keep a fairly large amount of cash on hand for their business, they are frequent targets of holdups. With the present invention, checks can be cashed without requiring actual cash so that cash checking establishments can do business with much less cash on hand. This significantly increases security. The person cashing the check can now leave the establishment cashless but with a card which enables him to access his cash by requesting it from a card reader or an ATM if, when and where needed. The check cashing establishment is less exposed because the "cashing" of the check in accordance with the present invention requires no cash at all, but involves simply the issuance of a card.

DESCRIPTION OF THE PREFERRED EMBODIMENT

Figure 1:
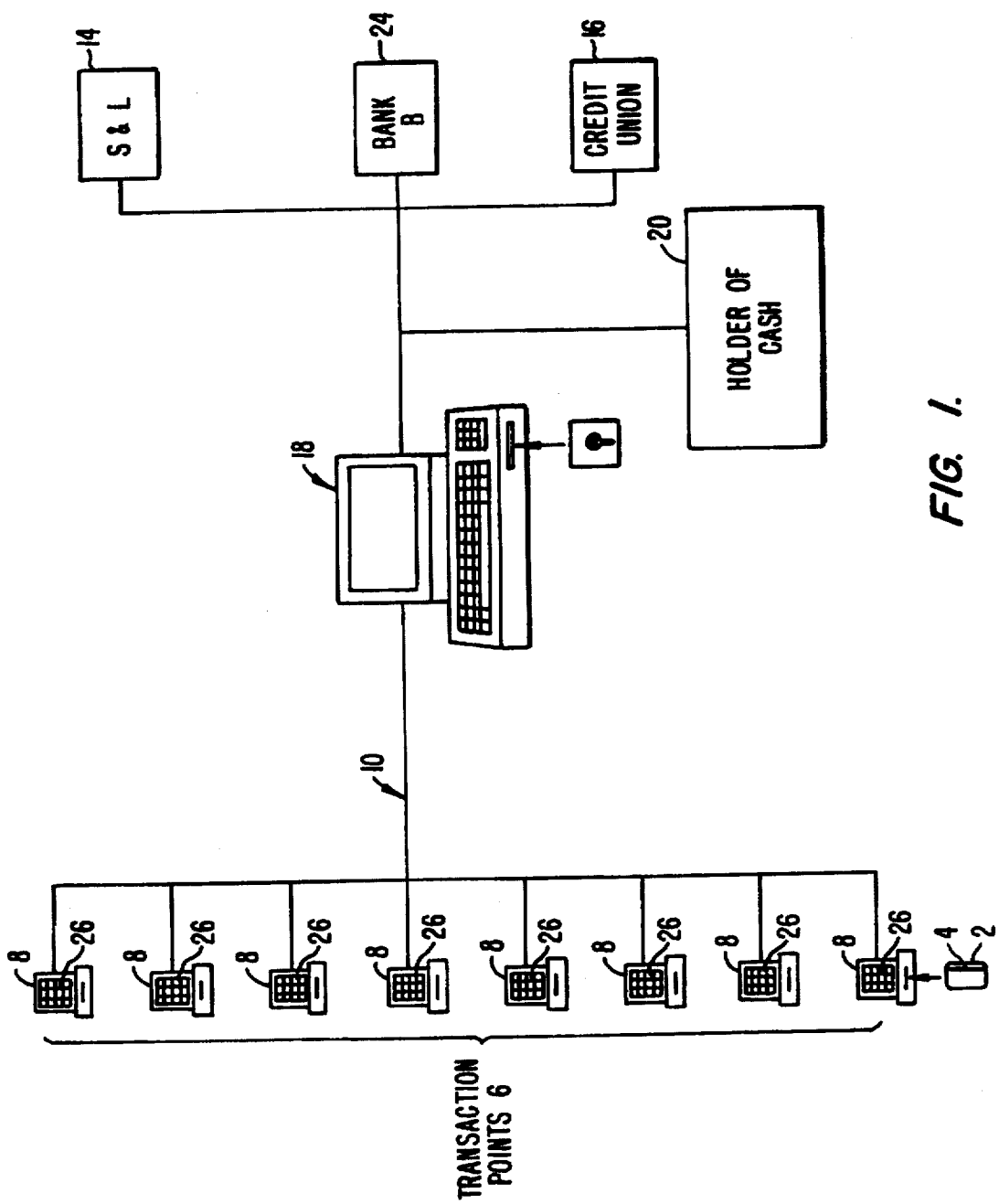
FIG. 1 is a schematic overall representation which shows a system on which the method of the present invention can be used.
Figure 2:
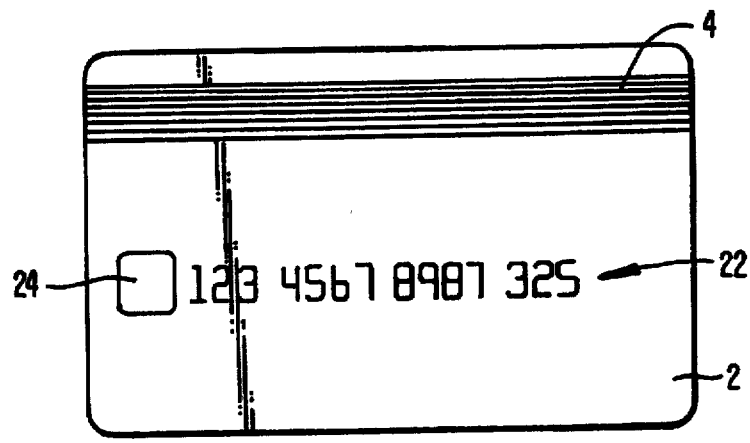
FIG. 2 is a flow diagram which illustrates the method of the present invention.
Figure 3:
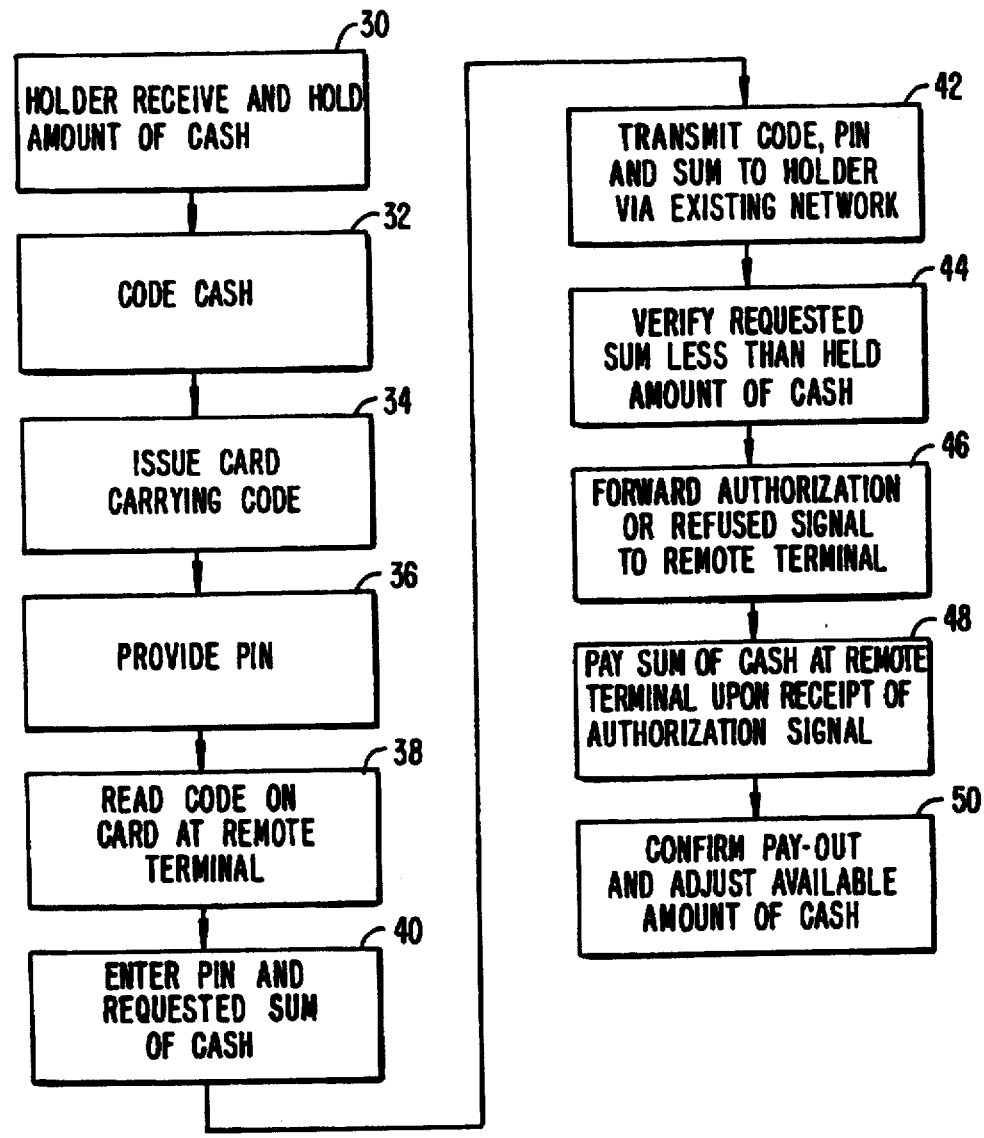
FIG. 3 is a plan view of encoded card used by the present invention.

Referring to FIGS. 1–3, a person who wishes to have virtually instant access to cash in accordance with the present invention without providing personal identification gives an amount of cash to be held for safekeeping by a holder of cash 20. In a first step 30, the cash is given to the holder directly or, more typically, to one of many agents of the holder such as the operator of a credit card terminal, a cash checking establishment, or the like, who may be located anywhere and who is linked with the holder of the cash by a communication link such as a regional or national credit card network. If the cash is given to an agent, the amount of cash handed over is communicated to the holder of the cash, who then generates in a second step 32 a code number which identifies the amount of cash; that is, how much cash was given to the holder, directly or via the agent, for safekeeping. To make the system of the present invention compatible with existing credit card networks, the code under which the holder holds the amount of cash is a so-called "PAN" number, a 16- to 19-digit number which is carried on all conventional credit and ATM cards and which, amongst others, identifies the holder of the cash as the issuer of the card. Another part of the PAN number identifies the amount of cash on the records kept by the cash holder; e.g. it corresponds to the code under which the holder keeps the cash.

The holder next issues a card in a step 34 which carries the code, both as an embossed number 22 and as an appropriate code on a magnetic strip 4 of a card 2, so that a card reader 8 at a transaction point 6 can read the magnetic strip. Alternatively or additionally, the card may include a programmable memory chip 24 which carries the same and/or additional information such as, for example, the amount of cash held by the holder and/or which carries the balance of cash held by the holder after one or more transactions; that is, after the carrier of the card has been paid some of the cash previously given to the holder or additional amounts of money have been given to the holder for keeping after the card had been issued.

Finally, in a step 36, cash holder 20 gives to the person to whom the card is issued, or the person selects, a PIN number which the cash holder associates with the amount of cash that is being held and which is associated with the PAN number so that a subsequent request for cash requires both numbers, as is standard practice when using ATM cards, for example.

The entire transaction exemplified by steps 30–36 in FIG. 3 takes only minutes and is completed without identifying the person who handed the amount of cash to cash holder 20 and without establishing an account, such as a bank or a credit card account, which would also identify the person. Thus, complete anonymity and confidentiality is assured while the amount of cash handed to the holder is kept safe and accessible only to the carrier of the card, who must also know the PIN number.

When the carrier of the card requires cash, he goes to the closest available card reader 8, which may be an ATM terminal or a credit card reader, for example, and inserts card 2 in the reader. The reader reads the typically magnetically encoded PAN code on a card in a step 38. The person now enters the applicable PIN number as well as the sum of cash that is requested on a keypad 26 of the reader in a step 40.

In a step 42 the reader next transmits the PAN code, the PIN number, and the requested sum of cash via a communication link 10, such as a local, regional or national network, to cash holder 20 where the information is received and processed by first identifying the amount of cash which corresponds to the incoming PAN code and PIN number information and then verifying in a step 44 that the sum of cash requested by card reader 8 at transaction point 6 is less than the amount of cash held by the holder under the number in question. If so, the holder forwards in a step 46 an authorization signal to the card reader at the transaction point, which serves as an instruction to pay to the person who used card 2 on reader 8 and who entered the PIN number the requested sum of cash. The sum of cash is then paid out in a step 48, either by the ATM machine or manually by the operator of the credit card reader.

Finally, in a step 50, card reader 8 preferably retransmits to the cash holder 20 confirmation that the requested sum of cash has been paid out and, to the extent necessary, the cash holder adjusts its records to appropriately reflect that the available amount of cash held under the code number in question has been reduced by the sum of cash that was just paid out at transaction point 6.

In terms of the overall system, the method of the present invention as above discussed links multiple card readers via a central computer 18 with cash holder 20. The computer is part of communication link 10, which can be a privately owned, local area network linking several cash payout transaction points within a given establishment or establishments with a centralized holder of cash, as, for example, when several transaction points where cash is available are linked to a central cash holding position in a casino. The communication link can also be a regional network linking certain types of establishments within a limited geographic area such as a city, a county, or a state, for example, or a national or worldwide network linking, for example, all credit card readers and/or ATM machines over such networks as INTERLINK, PLUS SYSTEM or STAR SYSTEM.

If the network is, for example, an established national network, a very large number of card readers 8 is linked by a network 10 via central computer 18 to a number of financial institutions such as banks 12, savings and loan associations 14, and/or credit unions 16. Holder 20 of cash is a network participant; that is, computer 18 functionally links it with the card readers 8 on the network. Part of the PAN number uniquely identifies the cash holder as a network participant so that when the reader transmits the PAN number from the inserted card to computer 18 a communication link between the reader and the cash holder is established. As is conventional, a computer operated by cash holder 20 first validates the card with the PAN code and the PIN number, although other coding/decoding techniques and numbers can be employed on private networks, for example, then verifies that the amount of cash available is sufficient to pay out the requested sum of cash, and authorizes the pay-out of the latter with an authorization signal discussed above.

Although the earlier described steps to practice the present invention can be performed manually, by manually inputting the PAN code (from the corresponding raised or offset numerals 22 embossed on credit card 2), the PIN number and the requested sum of cash via keypad 26 on card reader 8 and which can be manually processed by cash holder 20 upon receipt of the information, including manually sending the authorization or refusal signal to the sending card reader, the system is preferably fully computerized and automated. For this purpose, software in the present invention is executed by the processing system of the system shown in FIG. 1 to perform various functions. Details of the software may be found in source code appendix A attached to and made part of this application. Processing systems are present in each of card readers 8, central computer 18 and card holder 20 as well as in bank 12, savings and loan 14 and credit union 16. The combination of the processing systems, linked by network 10, forms a distributed processing system where functions performed in software may be arbitrarily performed at different locations for efficiency. For example, the step 42 of transmitting the PAN code, PIN number, etc. to cash holder 20 where the amount of cash is being held is typically performed by central computer 18. However, this step can also be performed by card reader 18 at the transaction point, by cash holder 20, or anywhere else on the system, as desired and most practical in any given case. Any discussion of specific software functions being performed by specific processing systems is therefore merely to illustrate the preferred embodiment.

Figure 4:
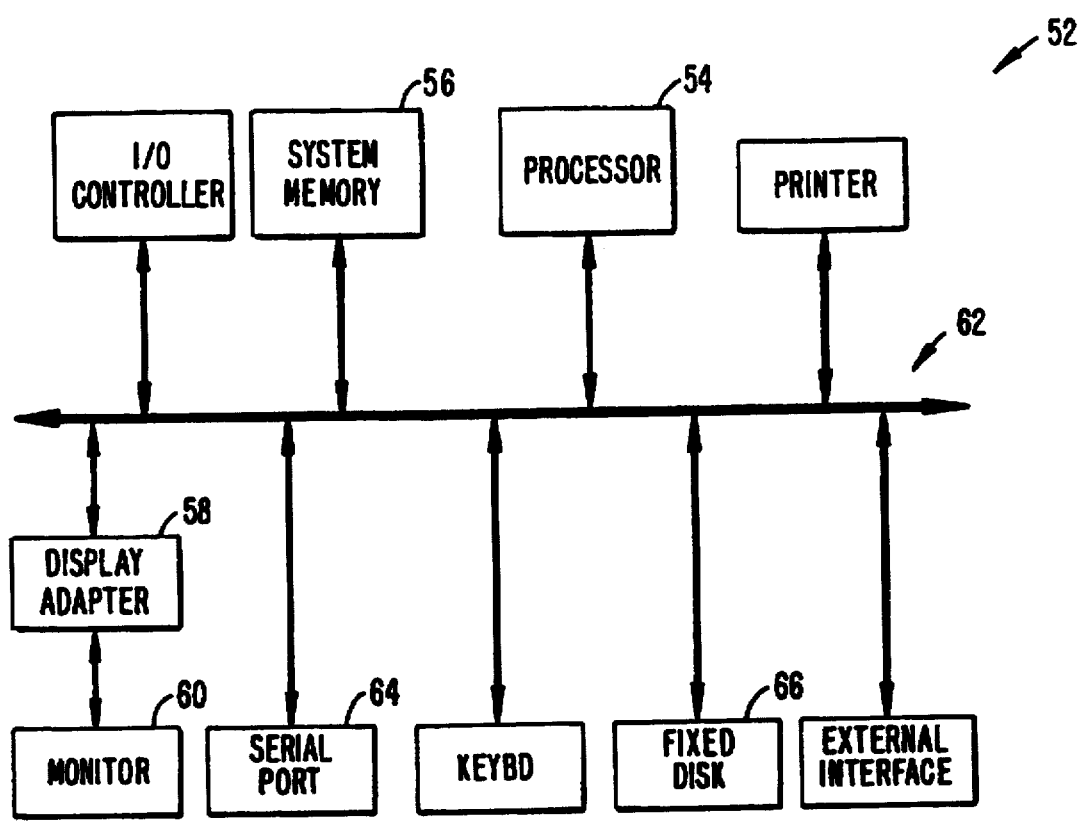
FIG. 4 is an illustration of basic subsystems in the processing system of FIG. 1.

FIG. 4 is an illustration of basic subsystems in a processing system 52 employed by the overall system illustrated in FIG. 1. Processing system 52 in FIG. 4 is that of central computer 18 but is also illustrative of other processing systems used in the present invention. In FIG. 4, subsystems are represented by blocks such as processor 54, system memory 56, display adapter 58, monitor 60, etc. The subsystems are interconnected via a system bus 62. Additional subsystems such as a printer, keyboard, fixed disc and others are shown. Peripherals and input/output (I/O) devices can be connected to the computer system by, for example, a serial port 64. For example, serial port 64 can be used to connect the computer system to a modem or mouse input device. The interconnection via system bus 62 allows processor 54 to communicate with each subsystem and to control the execution of instructions from system memory 56 or fixed disc 66 and the exchange of information between subsystems.

Other arrangements of subsystems and interconnections are possible. Also, each processing system may include different subsystems. For example, card readers 8 will typically include magnetic strip reading devices which are not necessary in central computer 18. The card readers can include full computer systems, such as a central computer, or can be small custom units, as in the preferred embodiment.

FIG. 3 illustrates a flow diagram showing the principal steps in a presently preferred method of the invention. In general, the flow diagram illustrates one or more software routines executing in a processing system (or performed manually) such as central computer 18 of FIG. 1. The routines may be implemented by any means as is known in the art. For example, any number of computer programming languages, such as "C", Pascal, FORTRAN, assembly language, etc., may be used. Further, various programming approaches such as procedural, object oriented or artificial intelligence techniques may be employed.

The steps of the flow diagrams may be implemented by one or more software routines, processes, subroutines, modules, etc. It will be apparent that the flow diagram and supporting description herein are illustrative of merely the broad logical flow of the method of the present invention and that steps may be added to, or taken away from, the flow diagram without departing from the scope of this invention. Further, the order of execution of steps in the flow diagrams may be changed without departing from the scope of the invention. Additional considerations in implementing the method described by the flow diagram in software may dictate changes in the selection and order of steps. Some considerations are event handling by interrupt-driven, polled or other schemes. A multiprocessing or multitasking environment can allow steps to be executed "concurrently". For ease of discussion, the implementation of the flow diagram was referred to as if it were implemented in a single software routine.

What is claimed is:

1. A method of holding an amount of cash which can increase and decrease over time for an unidentified person, securing the cash, and supplying a sum of cash upon demand to the person at a remote transaction point without identifying the person and without establishing an account which can be identified as belonging to any person comprising the steps of: receiving the amount of cash and holding it without identifying from whom the amount of cash was received and without identifying a person who may obtain the amount of cash; keeping a record of the amount of cash being held; issuing to the person a card free of information identifying the person and carrying a code identifying the amount of cash; communicating to the person a PIN number for use with the card; forming a communication link between a holder of the amount of cash and a multiplicity of at least one of ATMs and credit card reading terminals at least one of which is a machine located at the transaction point; inserting the card in the machine, machine-reading the code, and sending the read code via the communication link to the holder; transmitting the PIN number and a requested sum of cash to be supplied at the remote transaction point via the machine and the communication link to the holder; comparing the amount of cash with the requested sum of cash; forwarding an authorization signal to the machine if the sum of cash is less than the amount of cash and forwarding a refusal signal to the machine if the sum of cash exceeds the amount of cash; supplying the person at the transaction point with the sum of cash upon receipt of the authorization signal; and adjusting the record to reflect in the record a reduction in the amount of cash being held when the sum of cash is supplied to the person and an increase in the amount of cash being held when cash is added to the amount of cash being held; whereby the amount of cash is received from and the sum of cash is dispensed to the carrier of the card without identifying the person and the card can be repeatedly used by periodically replenishing the amount of cash being held.

2. A method according to claim 1 wherein the step of reading comprises the step of inserting the card in an automated teller machine which forms part of a network of automated teller machines.

3. A method according to claim 1 wherein the step of reading comprises the step of inserting the card in a credit card reading terminal which forms part of a network of credit card reading terminals.

4. A method according to claim 1 including the step of increasing the amount of cash available for subsequently supplying it to the person by receiving additional cash from the person.

5. A method according to claim 1 including the step of subtracting the sum of cash from the amount of cash to thereby establish a new amount of cash which can subsequently be supplied to the person.

6. A method according to claim 1 wherein the steps of sending, transmitting, comparing and forwarding are performed in substantially real time.

7. A method of holding a variable amount of cash for an unidentified person without establishing an account which can be identified as belonging to any person, and supplying a sum of cash upon demand at a remote transaction point without identifying the person to whom the sum of cash is to be supplied, the method comprising the steps of: receiving the amount of cash, holding it, and keeping a record of the amount of cash; identifying the amount of cash with a code that does not identify the person; issuing to the person a card carrying the code in machine readable form; communicating to the person a PIN number for use with the card; forming a communication link between a holder of the amount of cash and a multiplicity of card reading machines at least one of which is located at the transaction point; inserting the card in the machine, with the machine reading the code, and sending the read code via the communication link to the holder; providing the PIN number at the transaction point and transmitting it and a requested sum of cash to be supplied at the remote transaction point via the communication link to the holder; comparing the amount of cash with the requested sum of cash; forwarding an authorization signal to the machine if the sum of cash is less than the amount of cash and forwarding a refusal signal to the machine if the sum of cash exceeds the amount of cash; supplying the person at the transaction point who carried the card and provided the PIN number with the sum of cash upon receipt of the authorization signal; receiving an additional amount of cash; and adjusting the record to reflect a reduction in the amount of cash being held when the sum of cash is supplied to the person and to reflect an increase in the amount of cash being held when the additional amount of cash is received; whereby the amount of cash is received and the sum of cash is dispensed to the carrier of the card without identifying any person as part of any of the performed steps, the card can be repeatedly used by replenishing the amount of cash being held, and the variable, replenishable amount of cash is secured against withdrawals by unauthorized persons.

* * * * *